United States Patent
Codilian et al.

(10) Patent No.: US 6,707,635 B1
(45) Date of Patent: *Mar. 16, 2004

(54) METHOD AND APPARATUS FOR RRO LEARNING ON ALTERNATE TRACKS BEFORE AND AFTER SHIPPING TO CANCEL RRO IN A DISK DRIVE

(75) Inventors: Raffi Codilian, Irvine, CA (US); Donald R. Turner, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 09/684,561

(22) Filed: Oct. 5, 2000

(51) Int. Cl.$^7$ ............................................. G11B 5/596
(52) U.S. Cl. .................................. 360/77.04; 360/77.02
(58) Field of Search ........................ 360/77.04, 75, 360/77.02, 77.08; 324/207.11, 212; 29/593, 603.03

(56) References Cited

U.S. PATENT DOCUMENTS

| | | | |
|---|---|---|---|
| 6,097,565 A | * 8/2000 | Sri-Jayantha et al. | .... 360/78.09 |
| 6,115,203 A | * 9/2000 | Ho et al. | ................. 360/77.04 |
| 6,226,138 B1 | * 5/2001 | Blaum et al. | .................. 360/48 |
| 6,239,934 B1 | * 5/2001 | Sun et al. | ....................... 360/69 |
| 6,249,890 B1 | * 6/2001 | Ukani et al. | ................. 714/721 |
| 6,392,834 B1 | * 5/2002 | Ellis | ........................ 360/77.04 |
| 6,504,668 B1 | * 1/2003 | Takeuchi et al. | ......... 360/77.04 |
| 6,545,835 B1 | * 4/2003 | Codilian et al. | ......... 360/77.04 |
| 2002/0039248 A1 | * 4/2002 | Liu et al. | ................. 360/77.04 |

* cited by examiner

*Primary Examiner*—David Hudspeth
*Assistant Examiner*—Jason Olson
(74) *Attorney, Agent, or Firm*—Milad G. Shara, Esq.; Robroy R. Fawcett, Esq.

(57) ABSTRACT

The present invention may be embodied in a method, and related apparatus, for determining a repeatable runout (RRO) compensation value sets for a plurality of tracks on a disk in a disk drive, wherein the disk drive is initially manufactured and then shipped for installation in a host system. Each track comprises a plurality of embedded servo sectors that define a circumferential path that may have RRO requiring compensation during track following. The method comprises determining first RRO value sets for a first portion of the tracks to a first desired learning level by measuring the RRO for the first portion tracks based on a first predetermined number of disk rotations during the initial manufacturing of the disk drive. The first portion tracks are not adjacent to each other. Then, after the disk drive is shipped for installation in the host system, RRO value sets are determined for a second portion of tracks to a second desired learning level by measuring the RRO for the second portion tracks based on at least a second predetermined number of disk rotations. The learning technique of the invention allows the disk drive to be shipped for installation in a host system with a portion of its tracks having little or no RRO compensation. After shipment, the disk drive may continue to improve the RRO compensation until all of the tracks have been optimally compensated. Thus, the learning technique allows maintained manufacturing throughput without unnecessarily increasing manufacturing costs for high data storage capacity disk drives.

24 Claims, 8 Drawing Sheets

FIG. 4B    WRITTEN SERVO TRACKS

FIG. 4A    IDEAL SERVO TRACKS

TRACK CENTER REFERENCE WITH RRO COMPENSATION

FIG. 11A

TRACK CENTER REFERENCE WITHOUT RRO COMPENSATION

METHOD AND APPARATUS FOR RRO LEARNING ON ALTERNATE TRACKS BEFORE AND AFTER SHIPPING TO CANCEL RRO IN A DISK DRIVE

BACKGROUND OF THE INVENTION

1. Field of the Invention

The present invention relates to disk drives and more particularly to a technique for repeatable runout compensation for alternate tracks on a disk of a disk drive to facilitate manufacturing processes.

2. Description of the Prior Art

In order to remain competitive, disk drive manufacturers must continually provide increased storage capacity while rigidly controlling manufacturing cost. One key to increased storage capacity is increasing track pitch. A critical limiting aspect of increased track pitch is the ability of the disk drive servo system to maintain a read/write head location within a budgeted distance from a track centerline to avoid corrupting data on adjacent tracks during a write operation. This distance is sometimes known as "Track Misregistration" or TMR. One influence on the TMR budget is the effect of written in runout during servowriting. During operation, the disk drive attempts to follow the path of a track on the disk defined by the position of embedded servo sectors laid down during servowriting. The embedded servo sector positions can deviate from a so-called perfect circle due to, for example, vibrations, which occur during the servowriting process. Such vibration causes the track to thenceforth exhibit a track-dependent repeatable runout (RRO) which appears to the servo system as a position error signal (PES) for each servo sector in the track. The error can be "learned" and compensated for over a relatively lengthy process which scales with the number of tracks and the number of iterations for learning.

Despite the apparent advantages of compensating for RRO, present practice in the industry simply factors in a statistical budget for the error and scraps tracks which appear to have deviation beyond what the budget allows. This is driven by the economics of volume manufacturing, which dictates that increased time and capital equipment required would not support the benefit from RRO learning. Nevertheless, the demand for capacity continues to challenge servo system designers as the track pitch of disk drives grows inexorably smaller.

Accordingly, there exists a need for a disk drive having improved RRO compensation without significantly decreasing manufacturing throughput or unnecessarily increasing manufacturing costs.

SUMMARY OF THE INVENTION

The present invention may be embodied in a method, and related apparatus, for determining a plurality of RRO compensation value sets for a plurality of tracks on a disk in a disk drive wherein the disk drive is initially manufactured and then shipped for installation in a host system. Each track comprises a plurality of embedded servo sectors that define a circumferential path that may have RRO requiring compensation during track following. The method comprises determining, during the initial manufacturing of the disk drive, first RRO value sets for a first portion of the tracks to a first desired learning level by measuring the RRO for the first portion tracks based on a first predetermined number of disk rotations. The first portion tracks are not adjacent to each other. Then, after the disk drive is shipped for installation in the host system, determining RRO value sets for a second portion of the tracks to a second desired learning level by measuring the RRO for the second portion tracks based on a second predetermined number of disk rotations.

The first and second predetermined number of disk rotations may be at least 20 disk rotations. The first portion tracks may be about 10% to 50% of a total number of the plurality of tracks. Each first portion track may be separated from another first portion track by one or more second portion tracks.

The tracks may be bi-sequentially addressed from an inner-most first portion track to an outer-most first portion track and then from an outer-most second portion track to an inner-most second portion track. Alternatively, the tracks may be bi-sequentially addressed from an outer-most first portion track to an inner-most first portion track and then from an inner-most second portion track to an outer-most second portion track.

Further, after the disk drive is shipped for installation in the host system, second RRO value sets may be determined for the first portion tracks to a third desired learning level by measuring the RRO for the first portion tracks based on at least a third predetermined number of disk rotations. The third predetermined number of disk rotations is greater than the first predetermined number of disk rotations. The first predetermined number of disk rotations may be at least 4 disk rotations and the second and third predetermined numbers of disk rotations may be at least 100 disk rotations.

Additionally, before the step of determining the first RRO value sets for the second portion tracks, the first portion tracks may be interleaved with the second portion tracks and user data stored only on the first portion tracks. After the step of determining the first RRO value sets for the second portion tracks, the user data stored on the first portion tracks may be rewritten and stored on both the first and second portion tracks such that the data is written on adjacent tracks in sequential order.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
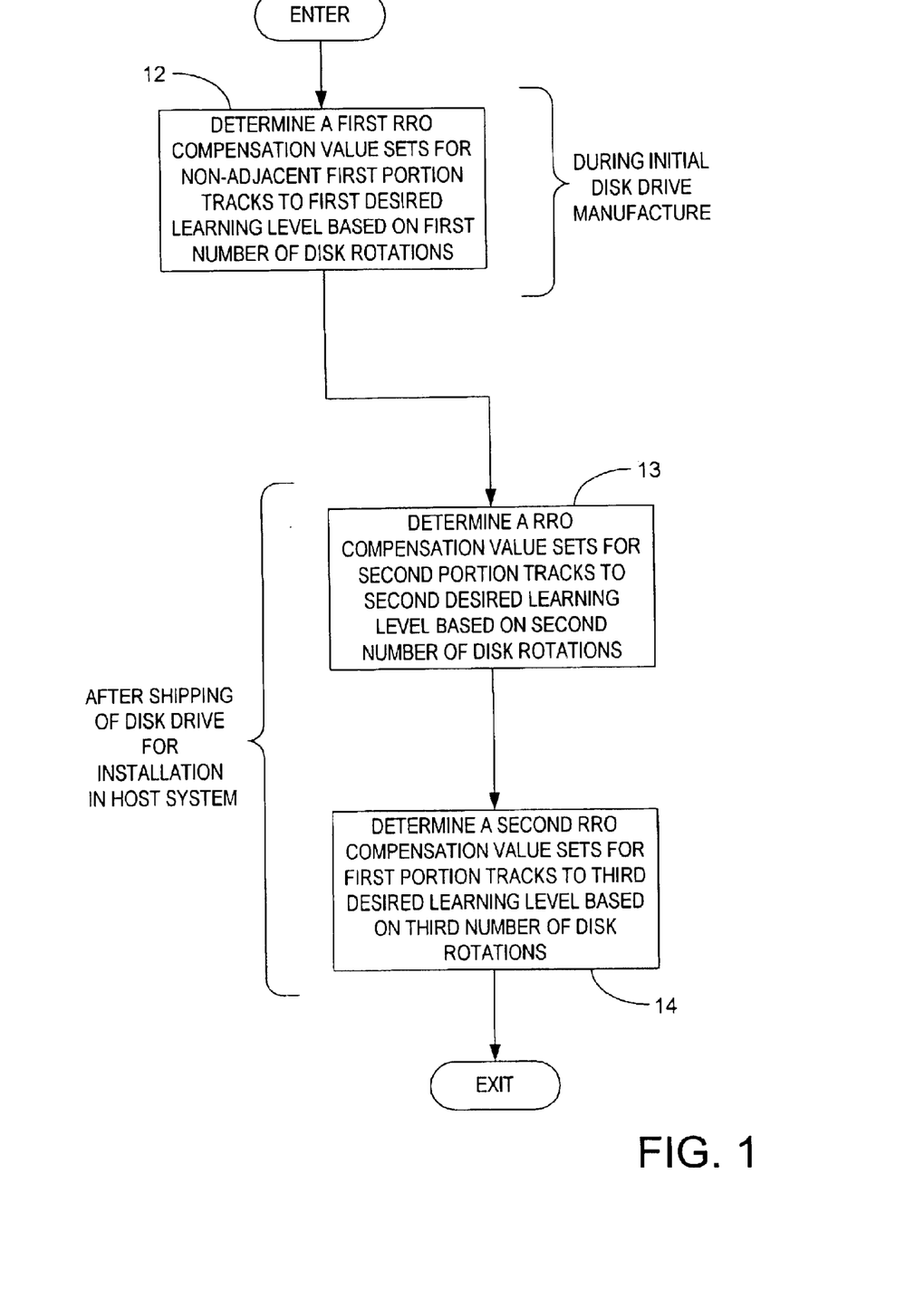
FIG. 1 is a flow diagram illustrating a method for determining repeatable runout (RRO) compensation value sets for non-adjacent tracks to an initial learning level during disk drive manufacture and for improving the RRO learning level for all tracks after shipping of the disk drive for installation in a host system, according to the present invention.

With reference to FIG. 1, the present invention may be embodied in a method, and related apparatus, for determining a plurality of RRO compensation value sets for a plurality of tracks 30 (FIG. 3) on a disk 28 in a disk drive 20 wherein the disk drive is initially manufactured and then shipped for installation in a host system 22. Each track comprises a plurality of embedded servo sectors 40 that define a circumferential path that may have RRO requiring compensation during track following. The method comprises determining, during the initial manufacturing of the disk drive, first RRO value sets for a first portion of the tracks to a first desired learning level by measuring the RRO for the first portion tracks based on a first predetermined number of disk rotations (step 12). The first portion tracks are not adjacent to each other. Then, after the disk drive is shipped for installation in the host system, RRO value sets are determined for a second portion of the tracks to a second desired learning level by measuring the RRO for the second portion tracks based on a second predetermined number of disk rotations (step 13).

Further, after the disk drive 20 is shipped for installation in the host system 22, second RRO value sets are determined for the first portion tracks 30 to a third desired learning level by measuring the RRO for the first portion tracks based on at least a third predetermined number of disk rotations (step 14). The third predetermined number of disk rotations is greater than the first predetermined number of disk rotations.

Figure 2A:
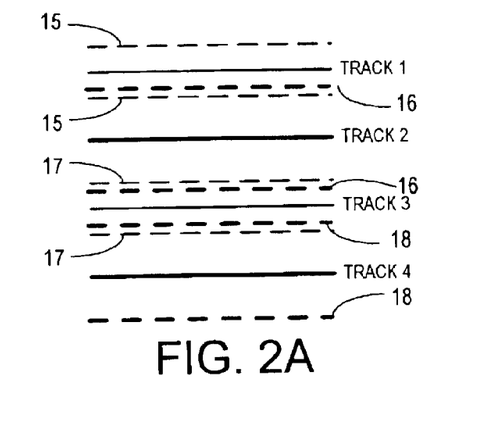
FIG. 2A is a schematic diagram illustrating first portion tracks, having initial RRO compensation to an initial learning level, separated by second portion tracks.
Figure 2B:
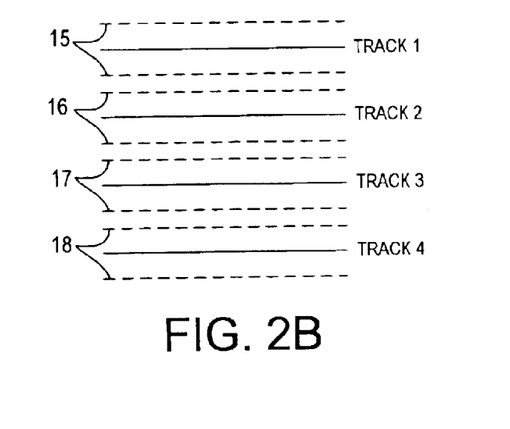
FIG. 2B is a schematic diagram illustrating first and second portion tracks having RRO compensation to an improved learning level.

The learning technique of the invention allows the disk drive 20 to be shipped for installation in a host system 22 with only a portion of its tracks 30 having initial RRO compensation. For purposes of this discussion, unless otherwise indicated track numbers shown in drawings are intended to refer to so-called physical tracks which have a one-to-one correspondence with position on the disk surface and are generally written and identified sequentially across the disk surface. Logical track numbers are assigned by the servo control system and do not necessarily correspond to a sequential order or position on the disk surface. With reference to FIG. 2A, tracks 1 and 3 are non-adjacent first portion tracks separated from each other by second portion track 2. Similarly second portion track 4 separates first portion track 3 from first portion track 5 (not shown). Tracks 1 and 3 have initial RRO compensation determined during initial manufacture. Track 1 has a track misregistration (TMR) budget shown by dotted line pairs 15 and track 3 has a TMR budget shown by dotted line pairs 17. The TMR budget allows the disk servo system to operate within practical limits of track following while providing a track-to-track spacing (i.e. track pitch) consistent with the storage capacity specified for the drive. Tracks 2 and 4 have little or no initial RRO compensation determined during initial manufacture and generally are not used for storing user data until the RRO compensation is improved for the tracks because the TMR budgets required for tracks 2 and 4, shown as dotted line pairs, 16 and 1 8, respectively, are too wide for practical operation due to the lack of RRO compensation. As a consequence, physical tracks 1 and 3 would preferably correspond to logical tracks 1 and 2 having data sequenced accordingly. After shipment, the disk drive may continue to improve the RRO compensation until all of the tracks have been sufficiently compensated to meet product requirements. With reference to FIG. 2B, the TMR budgets 16 and 18, for tracks 2 and 4, respectively, are narrowed through improved RRO compensation to equal TMR budgets, 15 and 17, for tracks 1 and 3. The learning techniques of the present invention take particular advantage of the fact that a host system rarely uses a major portion of the total storage capacity of a high data storage capacity disk drive when the disk drive is initially installed in the host system. Also, a typical host system has substantial idle periods during which RRO learning may be accomplished at negligible cost. Thus, the learning technique may be used without unnecessarily increasing manufacturing costs for high data storage capacity disk drives.

One method of learning RRO is disclosed in commonly assigned U.S. patent application Ser. No. 08/946,805, now U.S. Pat. No. 6,141,175, entitled "REPEATABLE RUN OUT CANCELLATION IN SECTORED SERVO DISK DRIVE POSITIONING SYSTEM," the entire disclosure of which is hereby incorporated by reference as if fully set forth herein.

Figure 3:
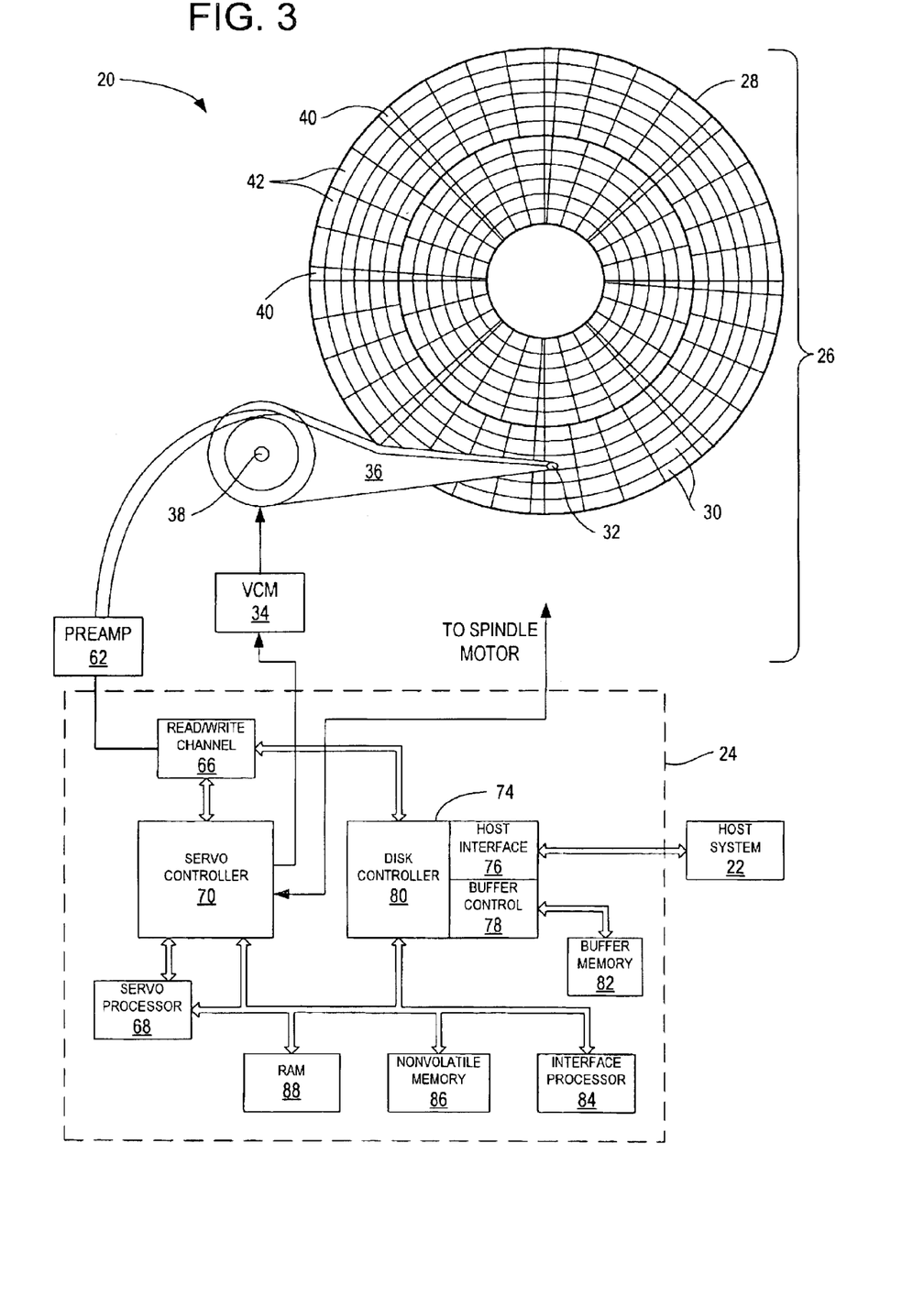
FIG. 3 is a block diagram of a disk drive for determining and improving RRO compensation value sets according to the method of FIG. 1.

Referring now to FIG. 3, shown is a disk drive 20 according to an embodiment of the present invention, that employs the method for determining RRO compensation value sets for non-adjacent tracks during initial manufacture and after shipping of the disk drive for installation in the host system 22. The disk drive comprises a disk control system 24 and a head disk assembly (HDA) 26. The HDA 26 includes a magnetic disk 28 having a plurality of concentric tracks 30 recorded thereon, a head 32 for writing user data to or reading user data from a selected one of the tracks in response to host command during a user operation of the disk drive, and an actuator 34 for positioning the head over the selected track. The actuator is typically implemented as a voice coil motor (VCM) which rotates an actuator arm 36 about a pivot 38 in order to position the head radially over the disk in response to control signals from the disk control system.

In a "headerless" disk drive 20, sector identification headers are not used and servo information is stored in embedded servo sectors 40. The concentric tracks 30 are partitioned into a number of headerless data sectors 42 with the embedded servo sectors recorded at a regular interval around the disk 28. The data sectors store the user data received from the host system. 22, and the embedded servo sectors store servo information for use in positioning a head 32 over a centerline of a selected track while writing data to or reading data from the disk.

Figure 4A:
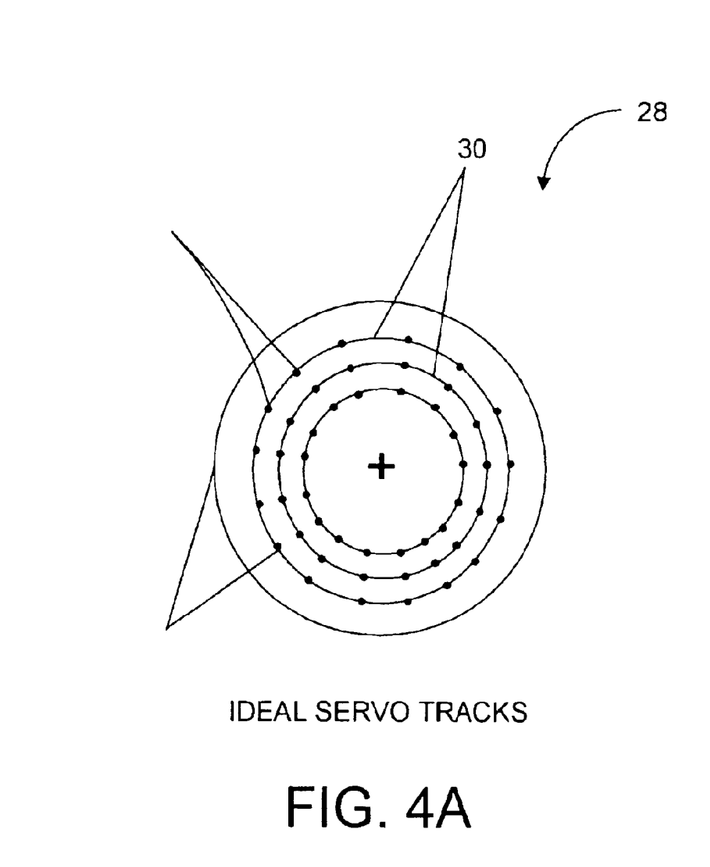
FIG. 4A is a schematic diagram illustrating ideal servo sector tracks on a disk of a disk drive.
Figure 4B:
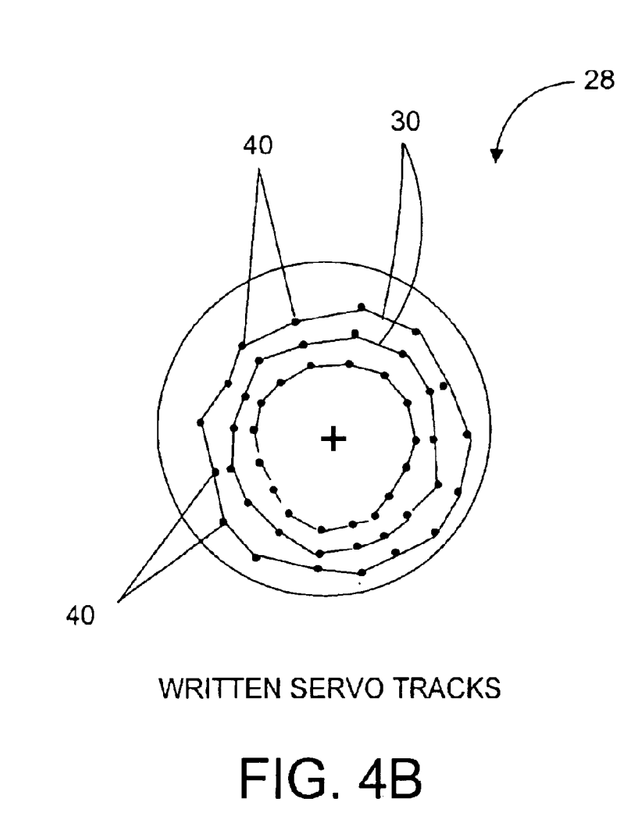
FIG. 4B is a schematic diagram illustrating written servo sector tracks exhibiting RRO.

An ideal track 30 is one that forms a perfect circle on the disk 28 as shown in FIG. 4A. During manufacture, servo information for the embedded servo sectors 40 is placed on the disk during a servo writing operation. A theoretical line drawn through the center of each servo sector would form a perfect circle if the servo sectors were written perfectly. In practice however, errors occur during servowriting so that the line drawn through the center of actual servo sectors 40 might appear as shown in FIG. 4B. These deviations from the ideal track centerline can occur due to spindle runout, vibrations or movements during servo writing operation, and media defects or noise in the region of the servo bursts.

Figure 5:
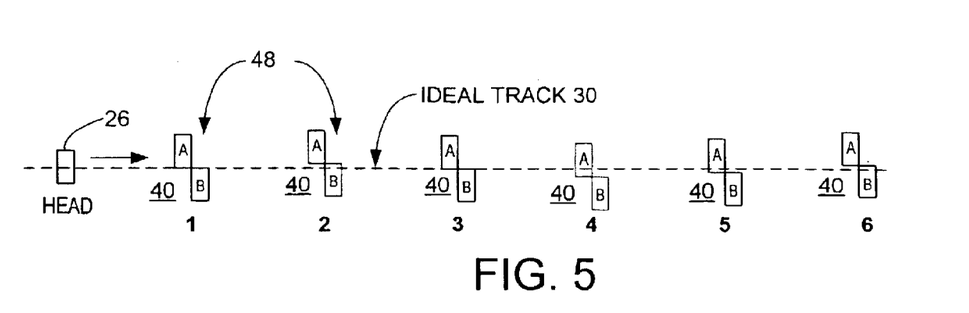
FIG. 5 is a schematic diagram illustrating several servo burst positions on a track exhibiting RRO with respect to an ideal track centerline.

FIG. 5 illustrates servo position information on a segment of a track 30, shown as a straight line for illustrating RRO. Each servo sector 40 has at least one burst pair 48 for position reference. An ideal track is shown as a dashed line. Desirably, the head 26 is centered along the track when it is centered over the line formed by the junction of the A and B bursts of burst pair 48. As shown, servo bursts 48 labeled 1 and 3 are aligned with an ideal track centerline. Servo bursts 2 and 6 are slightly above the ideal track centerline and servo bursts 4 and 5 are slightly below the ideal track centerline resulting in the track RRO. The servo burst deviations from the centerline, including the RRO caused deviations, are indicated as a position error signal (PES). It will be understood by one skilled in the art that determining the position of the head in a real disk drive environment is a more complex process involving accounting for head skew relative to the track, linearity and other factors, however the simplified illustration serves to focus attention on the learning of RRO to economically achieve high density recording.

Figure 6A:
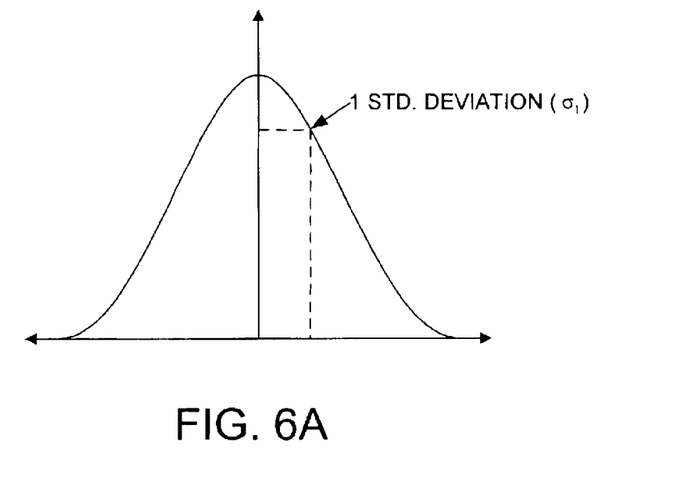
FIG. 6A is a graph of RRO measurement error based on a first number of disk rotations.
Figure 6B:
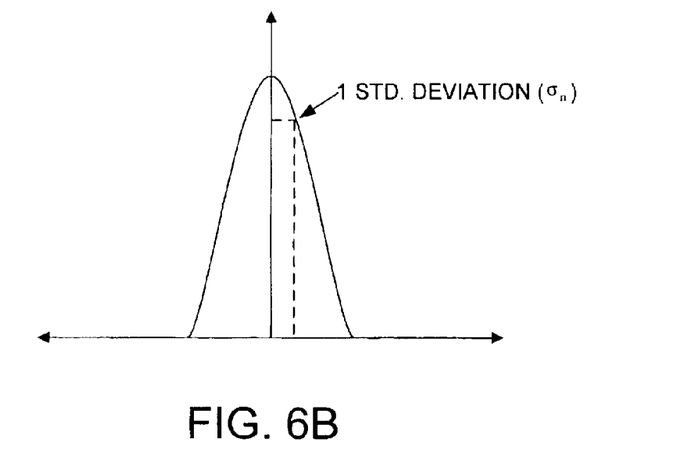
FIG. 6B is a graph of RRO measurement error based on a second number of disk rotations.

The PES includes the RRO and nonrepeatable errors that normally occur during disk drive operation. As shown in FIG. 6A, the RRO measurements based on one rotation have a relatively large standard deviation $\sigma_1$. By averaging the PES over several revolutions, the RRO measurement may be learned with improved approximation error as shown by the standard deviation $\sigma_n$ shown in FIG. 6B. The learned RRO improves with the number of disk rotations as follows:

$$\sigma_1 = \frac{\sigma_2}{\sqrt{n}} \qquad \text{Equation 1}$$

where N is the number of learning disk rotations used in the RRO measurement.

Figure 7:
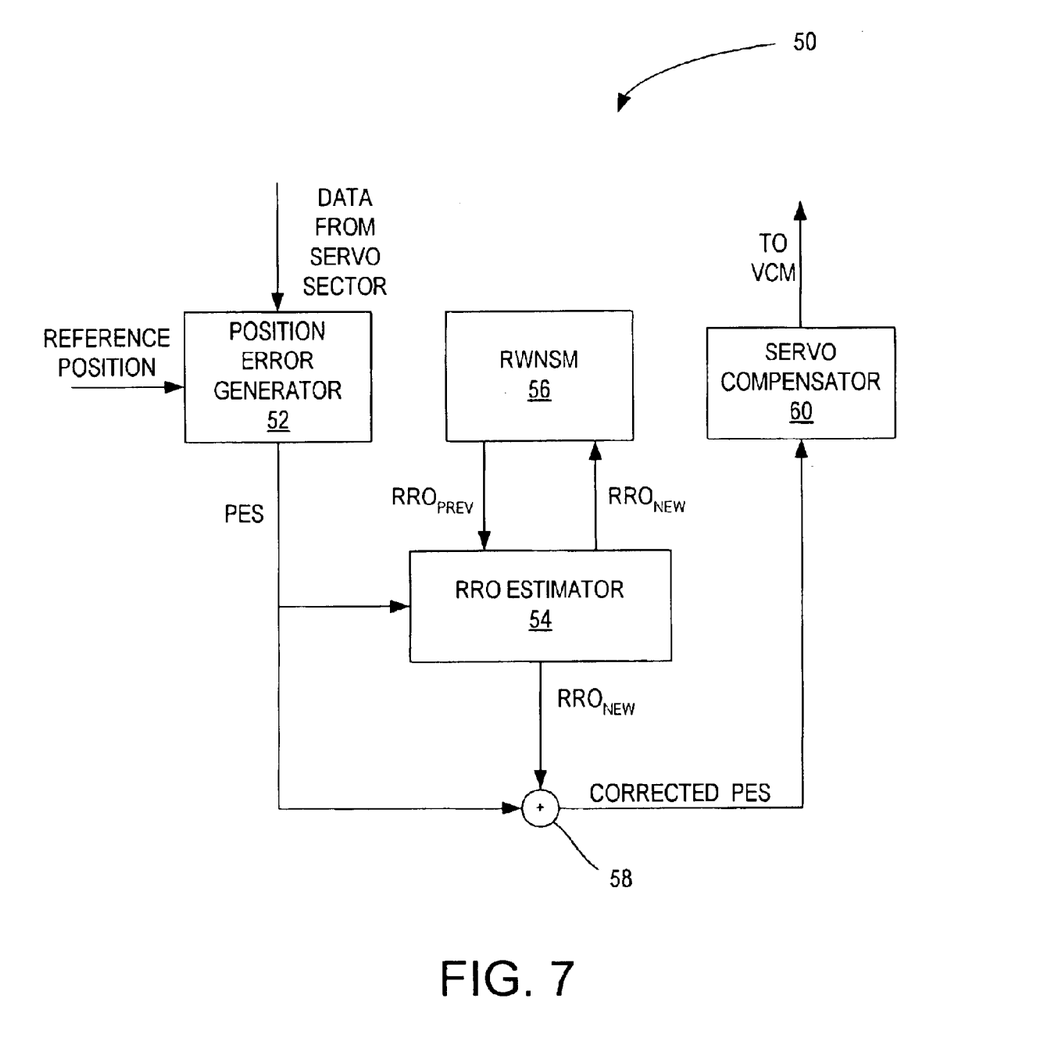
FIG. 7 is a schematic diagram of a servo control loop for determining and using RRO compensation value sets, according to the present invention.

The RRO may be learned using a servo control loop 50 shown in FIG. 7. A position error generator 52 generates the PES in response to the servo bursts 48 recorded on the selected track 30 in the embedded servo sectors 40. The PES is indicative of a location of the head 32 with respect to a centerline of the selected track 30. An RRO estimator 54, responsive to a previous RRO estimate ($RRO_{PREV}$) preferably stored in a read/writeable non-volatile semiconductor memory (RWNSM) 56 and the PES, generates a new RRO estimate ($RRO_{NEW}$) which is stored to the RWNSM 56 in place of the previous RRO estimate during the user operation of the disk drive 20. On average the new RRO estimate is more accurate (i.e. a better approximation of the actual RRO) than the previous RRO estimate and the new RRO estimate tracks changes in the actual RRO. A means, such as adder 58, combines the PES with the new RRO estimate to form a corrected position error signal (CPES), and a servo compensator 60, responsive to the CPES, generates an actuator control signal applied to the VCM 34 for use in maintaining the head 32 over the centerline of the selected track. The servo compensator implements a suitable servo control effort, such as the well-known proportional-integral-derivative (PID) control effort.

As the servo sectors 40 pass under the head 32, the position error generator 52 evaluates the servo track addresses and the servo bursts 48 within the servo sectors to generate the PES. In a well-known manner, the position error generator 52 compares the position indicated from reading the servo sector data with a reference position derived from a command received from the host system 22 to generate a difference signal or PES. As previously discussed, RRO can appear as a component of PES.

The RWNSM 56 preferably stores an RRO estimate for each servo wedge 40 in each of the tracks 30 recorded on the disk 28. The initial values for the RRO estimates are determined during manufacturing based on an initial number of disk rotations. The initial values for the RRO estimates are stored in the RWNSM 56. During normal user operations while the servo system is tracking the centerline of a selected track, the PES is processed by the RRO estimator 54 in order to update the RRO estimates stored in the RWNSM. When a particular servo sector passes under the head 32, the previous RRO estimate ($RRO_{PREV}$) for that servo sector is retrieved from the RWNSM and processed by the RRO estimator to generate a new RRO estimate ($RRO_{NEW}$). The new RRO estimate ($RRO_{NEW}$) is subtracted from the current PES signal at adder 58 to generate a CPES signal applied to the servo compensator 60. The new RRO estimate ($RRO_{NEW}$) is also restored to the RWNSM in place of the previous RRO estimate for the current servo sector.

To update the RRO estimates, the RRO estimator 54 suitably implements a running average algorithm $$\frac{N(RRO_{PREV}) + \sum_{1}^{K} PES_{NEW}}{K+N} \qquad \text{Equation 2}$$

where N is a number of previous rotations for learning and K is an incremental number of rotations for additional learning. The number of data points included in the running average (i.e., the size of K+N) is selected to be significantly larger than the number of data points (number of revolutions) used to compute the initial value for the RRO estimates during manufacturing. Thus, the RRO estimate gradually improves as the disk drive performs normal user operations. For example, assuming only a portion of the disk drive 20 is used when it is first installed in the host system, a portion of the tracks may have no RRO learning or may have an initial RRO compensation based on only 4 to 8 revolutions or rotations and the remaining portion of the disk drive may have the initial RRO estimate based on at least 100 disk revolutions. During normal user operations, the initial RRO estimate is continually updated toward a more accurate estimate. In addition, the RRO estimate will track changes in the actual RRO that occurs over the life of the disk drive. This increases the reliability and longevity of the disk drive by attenuating the error in the RRO estimate which is essentially a noise source in the signal-to-noise ratio (SNR) of the read signal.

Although the above running average update algorithm will generally provide an adequate estimate of the actual RRO, other more sophisticated estimation algorithms could be employed. For example, since the actual RRO is a periodic signal, it can be estimated by extracting the fundamental frequency from its spectrum using a Fourier transform.

The RWNSM 56 is suitably implemented as any well-known semi-conductor device such as an electrically erasable and programmable read only memory (EEPROM), or using a FLASH memory. Because the RWNSM is non-volatile, the updated RRO estimates are saved even when the disk drive 20 is powered down.

The servo control loop 50 is implemented by the disk control system 24. The disk control system also includes circuitry and processors that provide an intelligent disk control system interface between a host system 22 and the HDA 26 for execution of read and write commands. In addition to the disk 28 and the actuator 34, the HDA 26 includes a preamplifier 62 and a spindle motor (not shown) for rotating the disk 28. The head 32 communicates with disk control system via the preamplifier. The preamplifier provides an amplified signal to a read/write channel 66 of disk control system.

A servo processor 68 commands a servo controller 70 to control the position of the head 32 over a target track 30 for subsequent execution of read or write commands. The servo processor 68 receives a representative form of a position signal sensed by the head, via the preamplifier 62 and the read/write channel 66, and performs calculations to calculate the position error signal. The servo controller responds to digital commands from the servo processor to provide a corresponding analog signal to the VCM 34. The servo processor calculates the new RRO estimate based on the position error signal and the previous RRO estimates. The new RRO estimate is combined with the PES to generate the CPES which is used to position the head relative to the disk. The servo processor also provides commands to the servo controller to maintain a substantially constant operational rotational velocity of the spindle motor.

The disk control system 24 includes an integrated circuit host interface and disk controller (HIDC) 74 having a host interface 76, a buffer controller 78 and a disk controller 80. The host interface 76 communicates with the host system 22. The buffer controller 78 controls a buffer memory 82 employed for storing data from the host system that is to be written to the disk 28 and for storing data read from the disk. The disk controller 80 sends data to and receives data from the read/write channel 66 and provides for error correction and error detection on data read from the disk.

An interface processor 84 handles the flow of data commands received by the host interface 76 by sending commands to and reading status from the disk controller 80. The interface processor and the servo processor 64 may be advantageously implemented using a single processor of sufficient processing power.

The RRO compensation value sets may be stored in a non-volatile memory 86, which may be read-only memory (ROM) or flash memory, as discussed above with respect to FIG. 6. Alternatively, RRO compensation value sets may be stored on reserve tracks 30 on the disk 28 and may be loaded into RAM 88 during operation. Storage of the RRO compensation value sets on the disk is described in U.S. patent application Ser. No. 09/436,930, now U.S. Pat. No. 6,493,173, entitled "A HEADERLESS DISK DRIVE COMPRISING REPEATABLE RUNOUT (RRO) CORRECTION VALUES RECORDED AT A USER DATA RATE" the disclosure of which is incorporated herein by reference.

Figure 8:
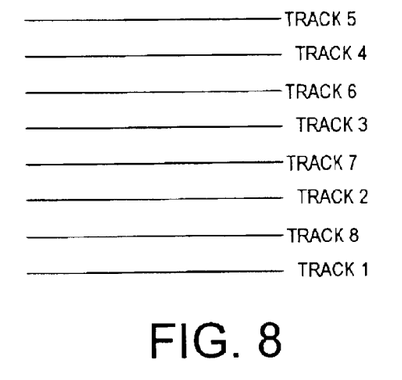
FIG. 8 is a schematic diagram of a first embodiment of bi-sequentially addressed tracks.
Figure 9:
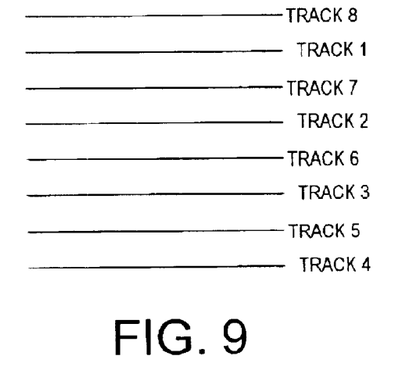
FIG. 9 is a schematic diagram of a second embodiment of bi-sequentially addressed tracks.

The physical tracks may be bi-sequentially addressed as shown in FIG. 8. The tracks may be logically addressed in sequence from an inner-most first portion track (track 1) to an outer-most first portion track (track 4) and then from an outer-most second portion track (track 5) to an inner-most second portion track (track 8). Alternatively, as shown in FIG. 9, the tracks may be logically addressed in sequence from an outer-most first portion track (track 1) to an innermost first portion track (track 4) and then from an inner-most second portion track (track 5) to an outer-most second portion track (track 8). By using the manner of logical track address assignment shown in FIGS. 8 or 9, the disk drive control system can maintain a sequential writing of data on the disk and postpone usage of tracks which do not have RRO compensation at a desired learning level until the learning can be achieved during idle periods following installation of the disk drive in a target system.

Before the RRO compensation value sets are determined for the second portion tracks, generally user data may be stored only on the first portion tracks. After the RRO compensation values sets have been learned for all of the tracks, the user data stored on the first portion tracks may be interleaved with user data stored on the second portion tracks. Advantageously, the user data stored on the first (and second) portion tracks may be rewritten on sequentially addressed tracks, as shown in FIG. 2B.

Figure 10:
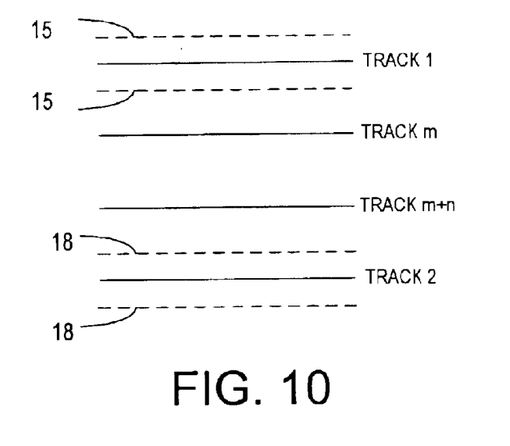
FIG. 10 is a schematic diagram illustrating first portion tracks, having initial RRO compensation to an initial learning level, separated by multiple second portion tracks.

As shown in FIG. 10, each first portion track (logical tracks 1 and 2) may be separated from another first portion track by more than one second portion track (e.g. tracks m and m+n). For example, if the first portion tracks represented about 10% of the total number of tracks, then each first portion track may be separated from other first portion tracks by nine tracks.

Figure 11A:
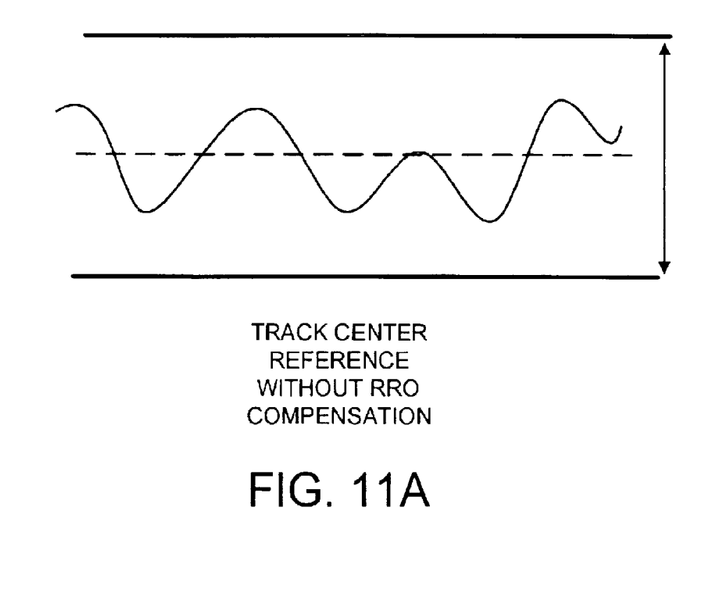
FIG. 11A is a diagram of an apparent track center to be followed as it appears to the controller without RRO compensation.
Figure 11B:
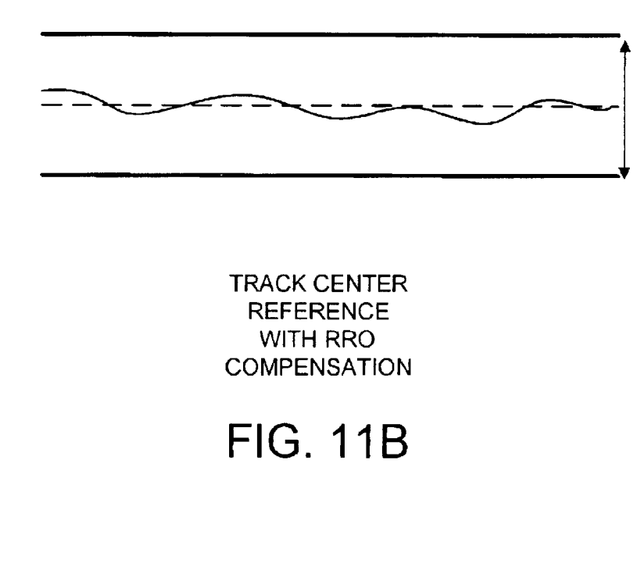
FIG. 11B is a diagram of the apparent track center to be followed by the servo controller after RRO compensation is applied.

FIGS. 11A & 11B illustrate by contrast a benefit of RRO learning which can result in improved disk drive areal density. In FIG. 11A, with no RRO learning the apparent track center to be followed deviates from a nominal track center (dotted line) such that a relatively wide TMR budget (indicated by the arrow) must be allocated for the track to avoid encroaching on adjacent tracks. In FIG. 11B, RRO compensation available from learning RRO results in a smaller deviation from the nominal track center, therefore the TMR budget and consequently the track pitch may be narrowed.

We claim:

1. A method of determining a plurality of repeatable runout (RRO) compensation value sets for a plurality of tracks on a rotating disk of a disk drive, wherein each track comprises a plurality of embedded servo sectors that define a circumferential path that may have RRO requiring compensation during track following and wherein the disk drive is initially manufactured and then shipped for Installation in a host system, the method comprising:
    determining, during initial manufacturing of the disk drive, first RRO value sets for a first portion of the tracks to a first desired learning level by measuring the RRO for the first portion tracks based on at least a first predetermined number of disk rotations; and
    determining, after the disk drive is shipped for installation in the host system, RRO value sets for a second portion of the tracks to a second desired learning level by measuring the RRO for the second portion tracks based on at least a second predetermined number of disk rotations.

2. A method of determining a plurality of RRO compensation value sets as defined in claim 1, wherein the first portion tracks are about 10% to 50% of a total number of the plurality of tracks.

3. A method of determining a plurality of RRO compensation value sets as defined in claim 1, wherein the first portion tracks are about 50% of a total number of the plurality of tracks.

4. A method of determining a plurality of RRO compensation value sets as defined in claim 1, wherein each first portion track is separated from another first portion track by more than one second portion track.

5. A method of determining a plurality of RRO compensation value sets as defined in claim 1, wherein each first portion track is separated from another first portion track by one second portion track.

6. A method of determining a plurality of RRO compensation value sets for a plurality of tracks on a rotating disk of a disk drive, wherein each track comprises a plurality of embedded servo sectors that define a circumferential path that may have RRO requiring compensation during track following and wherein the disk drive is initially manufactured and then shipped for installation in a host system, the method comprising:

- determining, during initial manufacturing of the disk drive, first RRO value sets for a first portion of the tracks to a first desired learning level by measuring the RRO for the first portion tracks based on at least a first predetermined number of disk rotations; and
- determining, after the disk drive is shinned for installation in the host system, RRO value sets for a second portion of the tracks to a second desired learning level by measuring the RRO for the second portion tracks based on at least a second predetermined number of disk rotations;
- wherein the first portion tracks are not adjacent to each other, each first portion track being separated from another first portion track by one second portion track; and
- wherein the tracks are bi-sequentially addressed from an inner-most first portion track to an outer-most first portion track and then from an outer-most second portion track to an inner-most second portion track.

7. A method of determining a plurality of RRO compensation value sets for a plurality of tracks on a rotating disk of a disk drive, wherein each track comprises a plurality of embedded servo sectors that define a circumferential path that may have RRO requiring compensation during track following and wherein the disk drive is initially manufactured and then shipped for installation in a host system, the method comprising:

- determining, during initial manufacturing of the disk drive, first RRO value sets for a first portion of the tracks to a first desired learning level by measuring the RRO for the first portion tracks based on at least a first predetermined number of disk rotations; and
- determining, after the disk drive is shipped for installation in the host system, RRO value sets for a second portion of the tracks to a second desired learning level by measuring the RRO for the second portion tracks based on at least a second predetermined number of disk rotations;
- wherein the first portion tracks are not adjacent to each other, each first portion track being separated from another first portion track by one second portion track; and
- wherein the tracks are bi-sequentially addressed from an outer-most first portion track to an inner-most first portion track and then from an inner-most second portion track to an outer-most second portion track.

8. A method of determining a plurality of RRO compensation value sets for a plurality of tracks on rotating disk of a disk drive, wherein each track comprises a plurality of embedded servo sectors that define a circumferential path that may have RRO requiring compensation during track following and wherein the disk drive is initially manufactured and then shipped for installation in a host system, the method comprising:

- determining, during initial manufacturing of the disk drive, first RRO value sets for a first portion of the tracks to a first desired learning level by measuring the RRO for the first portion tracks based on at least a first predetermined number of disk rotations; and
- determining, after the disk drive is shipped for installation in the host system, RRO value sets for a second portion of the tracks to a second desired learning level by measuring the RRO for the second portion tracks based on at least a second predetermined number of disk rotations;
- wherein the first portion tracks are not adjacent to each other; and
- wherein, before the step of determining the RRO value sets for the second portion tracks, the first portion tracks are interleaved with the second portion tracks and user data is stored only on the first portion tracks.

9. A method of determining a plurality of RRO compensation value sets as defined in claim 8, wherein, after the step of determining the RRO value sets for the second portion tracks, the user data stored on the first portion tracks is rewritten and stored on both the first and second portion tracks such that the data is written on adjacent tracks in sequential order.

10. A method of determining a plurality of RRO compensation value sets as defined in claim 1, wherein the first and second predetermined number of disk rotations is at least 100 disk rotations.

11. A method of determining a plurality of RRO compensation value sets as defined in claim 1, wherein the first and second predetermined number of disk rotations is at least 20 disk rotations.

12. A method of determining a plurality of RRO compensation value sets for a plurality of tracks on a rotating disk of a disk drive, wherein each track comprises a plurality of embedded servo sectors that define a circumferential path that may have RRO requiring compensation during track following and wherein the disk drive is initially manufactured and then shipped for installation in a host system, the method comprising:

- determining, during initial manufacturing of the disk drive, first RRO value sets for a first portion of the tracks to a first desired learning level by measuring the RRO for the first portion tracks based on at least a first predetermined number of disk rotations; and
- determining, after the disk drive is shipped for installation in the host system, RRO value sets for a second portion of the tracks to a second desired learning level by measuring the RRO for the second portion tracks based on at least a second predetermined number of disk rotations, wherein the first portion tracks are not adjacent to each other, and
- determining, after the disk drive is shipped for installation in the host system, second RRO value sets for the first portion tracks to a third learning level by measuring the RRO for the first portion tracks based at least a third predetermined number of disk rotations, wherein the third predetermined number of disk rotations is greater than the first predetermined number of disk rotations.

13. A method of determining a plurality of RRO compensation value sets as defined in claim 12, wherein the first predetermined number of disk rotations is at least 4 disk rotations and the second and third predetermined numbers of disk rotations are at least 100 disk rotations.

14. Apparatus for determining a plurality of repeatable runout (RRO) compensation value sets for a plurality of tracks on a rotating disk of a disk drive, wherein each track comprises a plurality of embedded servo sectors that define a circumferential path that may have RRO requiring compensation during track following and wherein the disk drive is initially manufactured and then shipped for installation in a host system, the apparatus comprising:

means for determining, during initial manufacturing of the disk drive, first RRO value sets for a first portion of the tracks to a first desired learning level by measuring the RRO for the first portion tracks based on at least a first predetermined number of disk rotations; and means for determining, after the disk drive is shipped for installation in the host system, RRO value sets for a second portion of the tracks to a second desired learning level by measuring the RRO for the second portion tracks based on at least a second predetermined number of disk rotations;

wherein the first portion tracks are not adjacent to each other.

15. Apparatus for determining a plurality of RRO compensation value sets as defined in claim 14, wherein the first portion tracks are about 10% to 50% of a total, number of the plurality of tracks.

16. Apparatus for determining a plurality of RRO compensation value sets as defined in claim 14, wherein the first portion tracks are about 50% of a total number of the plurality of tracks.

17. Apparatus for determining a plurality of RRO compensation value sets as defined in claim 14, wherein each first portion track is separated from another first portion track by more than one second portion track.

18. Apparatus for determining a plurality of RRO compensation value sets as defined in claim 14, wherein each first portion track is separated from another first portion track by one second portion track.

19. Apparatus for determining a plurality of RRO compensation value sets for a plurality of tracks on a rotating disk of a disk drive, wherein each track comprises a plurality of embedded servo sectors that define a circumferential path that maw have RRO requiring compensation during track following and wherein the disk drive is initially manufactured and then shipped for installation in a host system, the apparatus comprising:

means for determining, during initial manufacturing of the disk drive first RRO value sets for a first portion of the tracks to a first desired learning level by measuring the RRO for the first portion tracks based on at least a first predetermined number of disk rotations; and means for determining, after the disk drive is shipped for installation in the host system, RRO value sets for a second portion of the tracks to a second desired learning level by measuring the RRO for the second portion tracks based on at least a second predetermined number of disk rotations;

wherein the first portion tracks are not adjacent to each other, each first portion track being separated from another first portion track by one second portion track; and wherein the tracks are bi-sequentially addressed from an inner-most first portion track to an outer-most first portion track and then from an outer-most second portion track to an inner-most second portion track.

20. Apparatus for determining a plurality of RRO compensation value sets for a plurality of tracks on a run disk of a disk drive, wherein each track comprises a plurality of embedded servo sectors that define a circumferential path that may have RRO requiring compensation during track following and wherein the disk drive is initially manufactured and then shipped for installation in a host system, the apparatus comprising:

means for determining, during initial manufacturing of the disk drive, first RRO value sets for a first portion of the tracks to a first desired learning level by measuring the RRO for the first portion tracks based on at leas a first predetermined number of disk rotations; and means for determining, after the disk drive is shipped for installation in the host system, RRO value sets for a second portion of the tracks to a second desired learning level by measuring the RRO for the second portion tracks based on at least a second predetermined number of disk rotations;

wherein the first portion tracks are not adjacent to each other, each first portion track being separated from another first portion track by one second portion track; and wherein the tracks are bi-sequentially addressed from an outer-most first portion track to an inner-most first portion track and then from an inner-most second portion track to an outer-most second portion track.

21. Apparatus for determining a plurality of RRO compensation value sets as defined in claim 14, wherein the first and second predetermined number of disk rotations is at least 100 disk rotations.

22. Apparatus for determining a plurality of RRO compensation value sets as defined in claim 14, wherein the first and second predetermined number of disk rotations is at least 20 disk rotations.

23. Apparatus for determining a plurality of RRO compensation value sets for a plurality of tracks on a rotating disk of a disk drive, wherein each track comprises a plurality of embedded servo sectors that define a circumferential path that may have RRO requiring compensation during track following and wherein the disk drive is initially manufactured and then shipped for installation in a host system, the apparatus comprising:

means for determining during initial manufacturing of the disk drive, first RRO value sets for a first portion of the tracks to a first desired learning level by measuring the RRO for the first portion tracks based on at least a predetermined number of disk rotations; and means for determining, after the disk drive is shipped for installation in the host system RRO value sets for a second portion of the tracks to a second desired learning level by measuring the RRO for the second portion tracks based on at least a second predetermined number of disk rotations, wherein the first portion tracks are not adjacent to each other; and means for determining, after the disk drive is shipped for installation in the host system, second RRO value sets for the first portion tracks to a third learning level by measuring the RRO for the first portion tracks based at least a third predetermined number of disk rotations, wherein the third predetermined number of disk rotations is greater than the first predetermined number of disk rotations.

24. Apparatus for determining a plurality of RRO compensation value sets as defined in claim 23, wherein the first predetermined number of disk rotations is at least 4 disk rotations and the second and third predetermined numbers of disk rotations are at least 100 disk rotations.

* * * * *